A. J. ALSOPIEDY.
RAIL FASTENER.
APPLICATION FILED MAR. 20, 1911.
999,082.
Patented July 25, 1911.
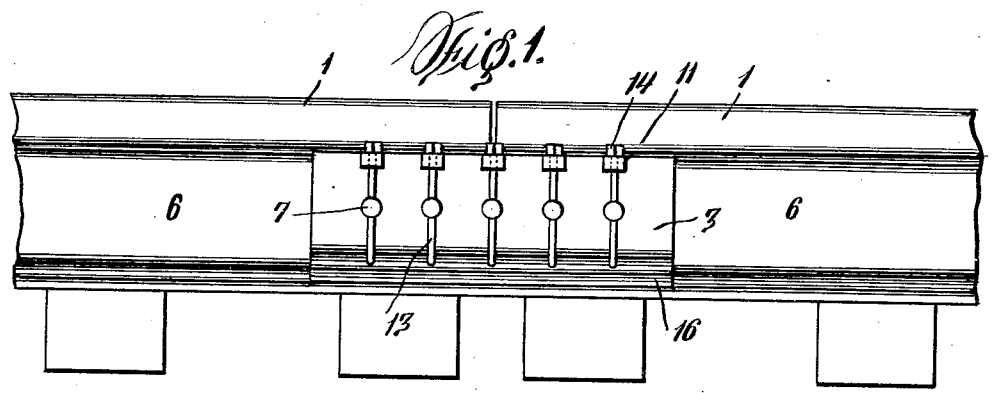
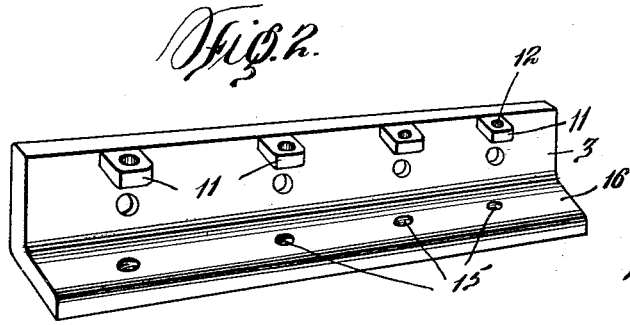
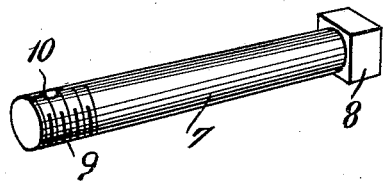
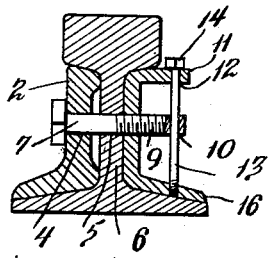
WITNESSES:
INVENTOR.
A. J. ALSOPIEDY,
BY
ATTORNEYS

UNITED STATES PATENT OFFICE.

ALBERT J. ALSOPIEDY, OF JEANNETTE, PENNSYLVANIA.

RAIL-FASTENER.

999,082.  Specification of Letters Patent.  Patented July 25, 1911.

Application filed March 20, 1911. Serial No. 615,606.

*To all whom it may concern:*

Be it known that I, ALBERT J. ALSOPIEDY, a citizen of the United States of America, residing at Jeannette, in the county of Westmoreland and State of Pennsylvania, have invented certain new and useful Improvements in Rail-Fasteners, of which the following is a specification, reference being had therein to the accompanying drawing.

This invention relates to rail fasteners, and the object of my invention is to provide positive and reliable means, in a manner as will be hereinafter set forth, for locking bolts in engagement with the confronting ends of rails, whereby said rails cannot become accidentally displaced.

I attain the above object by a mechanical construction that is simple, durable, easy to install and highly efficient for the purposes for which it is intended.

The invention will be hereinafter specifically described and then claimed, and reference will now be had to the drawing wherein like numerals of reference designate corresponding parts throughout the several views, in which:—

Figure 1 is a side elevation of a rail joint provided with the fastener. Fig. 2 is a perspective view of a detached splice bar. Fig. 3 is a perspective view of a detached bolt in accordance with this invention, and Fig. 4 is a cross sectional view of the rail fastener.

The reference numerals 1 denote rails having the sides thereof braced by splice bars 2 and 3, the bar 2 being of the ordinary and well known type, while the bar 3 is constructed to operate with the fastener. The bars 2 and 3 are provided with openings 4 registering with openings 5 in the webs 6 of the rails 1.

7 denotes bolts mounted in the openings 4 and 5, said bolts having the heads 8 thereof engaging the outer side of the splice bar 2 and the threaded ends 9 protruding from the outer side of the splice bar 3. The outer ends of the bolts 7 have vertical openings 10 for a purpose that will presently appear.

11 denotes a plurality of outwardly extending lugs carried by the upper edge of the splice bar 3 and these lugs are provided with openings 12 vertically alining with opening 10 in the ends of the bolts 7.

13 denotes vertical bolts arranged in the openings 12 and 10 with the heads 14 of said bolts engaging the upper sides of the lugs 11 and the lower threaded ends of said bolts engaging in sockets 15 provided therefor in the angular portion 16 of the splice bar 3, said sockets having the walls thereof threaded.

From the foregoing it will be observed that the vertical bolts 13 prevent the bolts 7 from rotating or becoming accidentally displaced relatively to the splice bars 2 and 3 and the rails braced thereby.

What I claim is:—

In a rail fastener, the combination with rails having the webs thereof provided with openings, of splice bars bracing the sides of said rails, bolts mounted in said splice bars and extending through the openings of the webs of said rails, said bolts having the threaded ends thereof provided with vertical openings, apertured lugs carried by the upper edge of one of said splice bars and vertical bolts mounted in said lugs and extending through the openings of said bolts, said splice bar having the angular portion thereof provided with sockets adapted to receive and hold the lower ends of said vertical bolts, substantially as described.

In testimony whereof I affix my signature in the presence of two witnesses.

ALBERT J. ALSOPIEDY.

Witnesses:
WM. E. CAREY,
JOHN ALBERTO SETTI.

Copies of this patent may be obtained for five cents each, by addressing the "Commissioner of Patents, Washington, D. C."